(No Model.)

L. STEIGERT.
MEAT CUTTING MACHINE.

No. 545,180. Patented Aug. 27, 1895.

Witnesses:
Frank Brown
Henry Rechtin

Inventor:
Leopold Steigert,
By T. C. Brecht
Attorney.

UNITED STATES PATENT OFFICE.

LEOPOLD STEIGERT, OF CINCINNATI, OHIO.

MEAT-CUTTING MACHINE.

SPECIFICATION forming part of Letters Patent No. 545,180, dated August 27, 1895.

Application filed August 31, 1894. Serial No. 521,826. (No model.)

*To all whom it may concern:*

Be it known that I, LEOPOLD STEIGERT, a citizen of the United States, residing at Cincinnati, in the county of Hamilton and State of Ohio, have invented certain new and useful Improvements in Meat-Chopping Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in that class of meat-cutting machines in which a revolving bowl with revolving knives are employed to cut the meat used in the manufacture of sausages, &c.

The object of my invention is to produce a meat-cutting machine in which the meat can be cut in a more perfect manner and as fine as desired by double-bladed knives rotating in opposite directions and arranged to revolve as close as possible against each other with their cutting-edges, so as to produce a cut similar to the blades of a pair of shears, by which means any tough pieces, sinews, &c., can be cut; also to produce means by which the bowl in which the meat is placed can be kept cool and thereby the meat also during the operation of the cutting, and this is a very important feature of my invention, as it is well known that the meat when cut in the ordinary machines now in use is liable to become heated, and is then often spoiled, and, finally, to produce means by which the blades of the knives can be accurately adjusted toward or from each other, so as not to bear too hard against each other or be placed too far apart.

With these objects in view my invention consists in the peculiar construction of certain details and the arrangement of parts, as will be more fully described hereinafter and specifically pointed out in the claims, reference being had to the accompanying drawings, and the letters of reference marked thereon.

Like letters indicate similar parts in the different figures of the drawings, in which—

Figure 1:
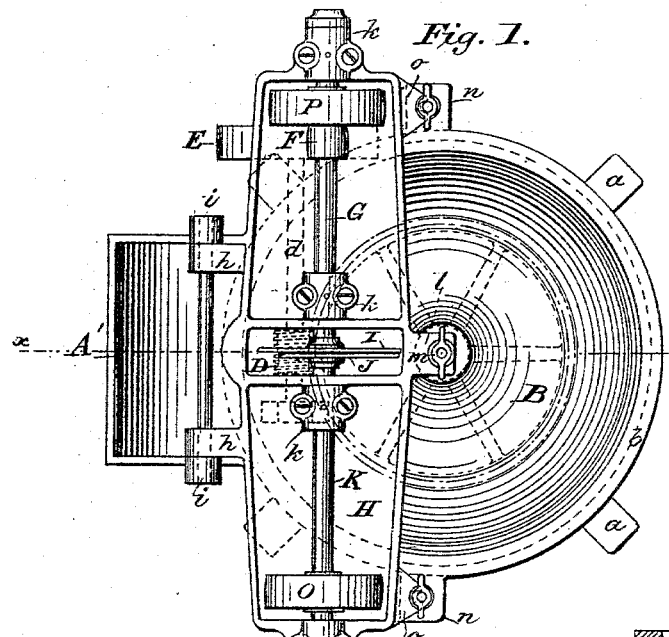
Figure 4:
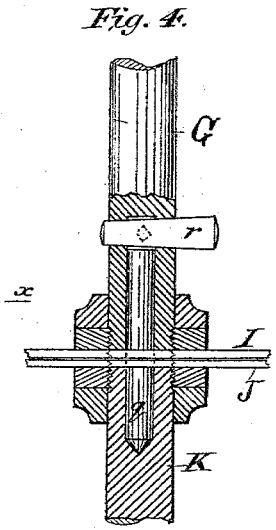
Figure 2:
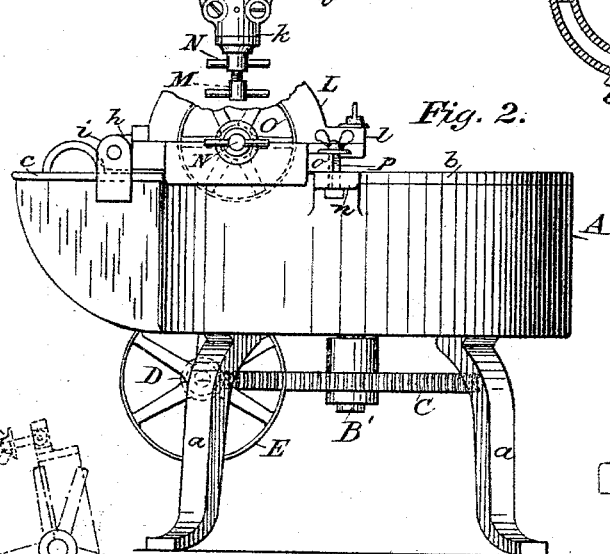
Figure 6:
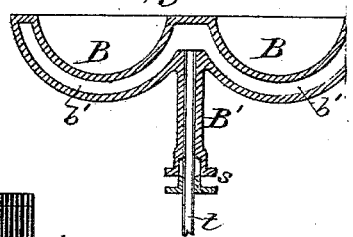
Figure 5:
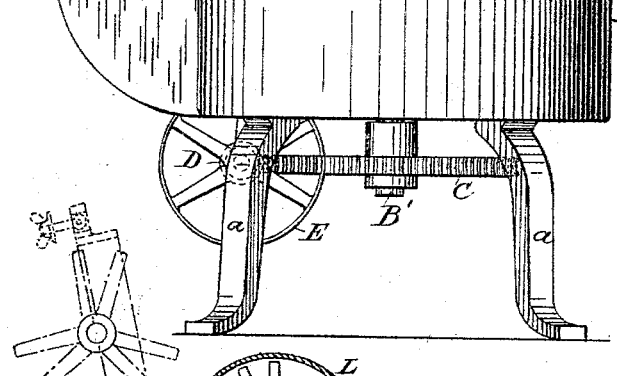
Figure 5:
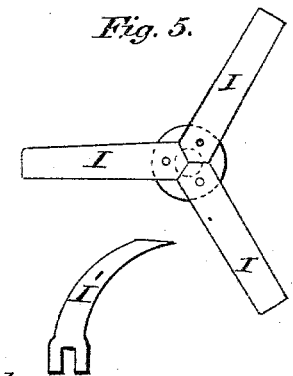
Figure 3:
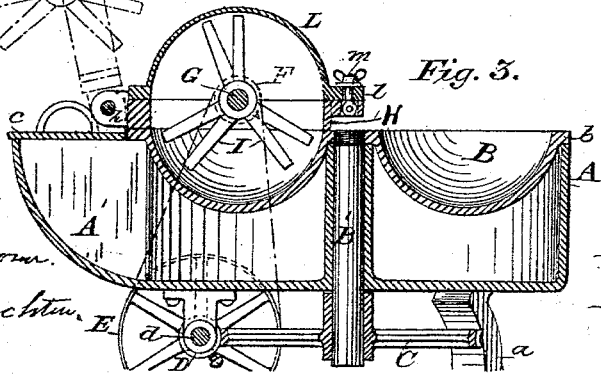

Figure 1 represents a plan or top view of my improved meat-cutting machine. Fig. 2 is a side elevation of the same. Fig. 3 is a vertical section on the line $x$ $x$ of Fig. 1. Fig. 4 is an enlarged detail view of the shaft and the adjusting devices for the knives. Fig. 5 is a modified form of securing the knives. Fig. 6 is a modified form of bowl.

In the accompanying drawings, A represents a tank or receptacle of suitable size and material and having legs $a$ to support it, and in said tank is placed a bowl B, provided with a flange $b$ for its support. It is secured to a vertical shaft B', which has at its lower end a worm-wheel C, with which the worm-pinion D meshes, the pinion being secured to a shaft $d$, arranged in proper bearings on the bottom of the tank A. The shaft $d$ has on its outer end a pulley E, receiving motion from a small pulley F on the shaft G, and by this means the bowl receives its rotary motion. The tank A has preferably on its rear side an extension A' with an open top, through which ice, ammonia, brine or any other suitable cooling material is introduced, and is then closed by a cover $c$.

On the upper side of the bowl and tank is placed a plate H, containing the cutting-knives I and their operating mechanism. The plate H is provided at its rear side with lugs $h$, by which it is hinged to lugs $i$ on the side of the extension A' of the tank, so that said plate can be tilted, as shown in dotted lines in Fig. 3, for cleaning, repairing, &c., at any time desired. On its front side the plate H has the lugs $o$, provided with open slots, with which the bolts and thumb-screws $p$, arranged in lugs $n$ on the sides of the tank A, engage and secure it in place. A central lug $l$ at the front side of the plate H and provided with a swiveled bolt and thumb-screw $m$, secures the cover L in position over the knives, of which there are two sets or series I and J. The knives are attached to the adjacent ends of two aligned oppositely-revolving shafts G and K, as shown in Figs. 1 and 4. The shafts are journaled in bearings $k$ on the plate H.

The knives are secured to the shafts by screwing them on their adjoining ends or by pins, keys or in equivalent manner, so that they can be readily taken off for sharpening, renewal, &c. They may be made in one piece—*i. e.*, three blades on a central hub or separately, as shown in Fig. 5, and fitted together with their ends, or they may be curved, as shown at I' in Fig. 5. One of the shafts K is arranged in such manner as to be immovable longitudinally, while the other one can be adjusted endwise by a hand-screw M, which bears against its end, and after adjustment it is secured in place by a lock-nut N.

To prevent the blades of the knives from rubbing too hard against each other the device shown in Fig. 4 is employed. In this a central steel pin q is arranged and is pointed at one end that bears against one end of one of the shafts, while the other end of said pin is flat and fits within a socket in the end of the other shaft and is acted on by a wedge r, arranged in a suitable slot, and which can be very delicately adjusted. On the outer ends of the shafts are secured the pulleys O and P, passing through suitable holes or openings in the plate H. Said pulleys receive their motion by suitable belts from the usual line-shafting above, but in such manner that one of the shafts with its knives is rotated in one direction while the other part rotates in the opposite direction, thus producing a shearing cut, by which sinews and other tough parts of the meat can be cut in an easy and expeditious manner.

If the machine is to be operated by hand, especially in small establishments, a pair of light columns or rods can be secured to the plate H, provided at their upper ends with journals for a shaft with pulleys, to which the pulleys O and P are then connected by suitable belts and receive motion from a crank-handle or its equivalent.

In the modification shown in Fig. 6 the bowl B is made with a double shell to form a space b' for the circulation of salt water, ammonia water, or its equivalent, which is introduced through the hollow shaft B' that may be provided with a stuffing-box s to prevent leakage. A tube t may be used, if desired, to prevent injury to the hollow shaft by deterioration, &c., and said tube can be connected to any source of supply. An overflow-opening can also be provided to return said water and use it over again.

In operation the plate H is swung upon its hinges, as shown in Fig. 3, and the material placed around within the bowl B. The plate is then lowered over the bowl and secured with the knives on the shafts projecting down into the material in the bowl. Power is then applied to the pulleys O and P, whereby the knives are rotated in opposite directions and the bowl is slowly rotated so as to cause the material to pass within reach of the knives.

Having thus described my invention, what I claim, and desire to secure by Letters Patent, is—

1. In a meat cutting machine, the combination, with a tank, of a frame secured to the top thereof, a bowl within the tank, two shafts journaled in the frame in alignment with each other, the adjacent ends of which are provided with knives, and means for rotating the shafts in opposite directions, substantially as set forth.

2. In a meat cutting machine, the combination, with a rotary bowl, of two shafts journaled above the same in alignment with each other, the adjacent ends thereof being provided with knives, and means for rotating said shafts in opposite directions, whereby the knives have a shearing cut, substantially as set forth.

3. In a meat cutting machine, the combination, with a rotary bowl, of a frame above the same, two shafts journaled in the frame in alignment with each other, one of the shafts being longitudinally immovable and the other one being adjustable longitudinally relatively thereto, knives upon the adjacent ends of said shafts, and means for rotating the shafts in opposite directions, substantially as set forth.

4. In a meat cutting machine, the combination, with a rotary bowl, of a frame above the same, two shafts journaled in the frame in alignment with each other, a pin in the end of one having its opposite end in engagement with the end of the other shaft, a wedge in engagement with said pin, knives upon the ends of the shafts, and means for rotating the shafts in opposite directions, substantially as set forth.

5. In a meat cutting machine, the combination, with a tank, of a frame hinged at one side thereof, means for securing the opposite side of the frame to the tank, two shafts in the frame in alignment with each other, knives upon the adjacent ends of the shafts, and means for rotating the shafts in opposite directions, substantially as set forth.

6. The combination, with a tank provided with an extension upon one side, of a cover for the extension, a frame hinged to the tank, a rotary bowl within the tank, shafts journaled in the frame in alignment with each other, knives upon the adjacent ends of the shafts, a cover for the knives, and means for rotating the shafts in opposite directions, substantially as set forth.

In testimony whereof I affix my signature in presence of two witnesses.

LEOPOLD STEIGERT.

Witnesses:
FRANK BURNS,
HENRY RECHTIN.